Sept. 8, 1931.  M. E. DUNKLEY  1,822,276
FRUIT TREATMENT MACHINE AND METHOD
Filed Sept. 1, 1928
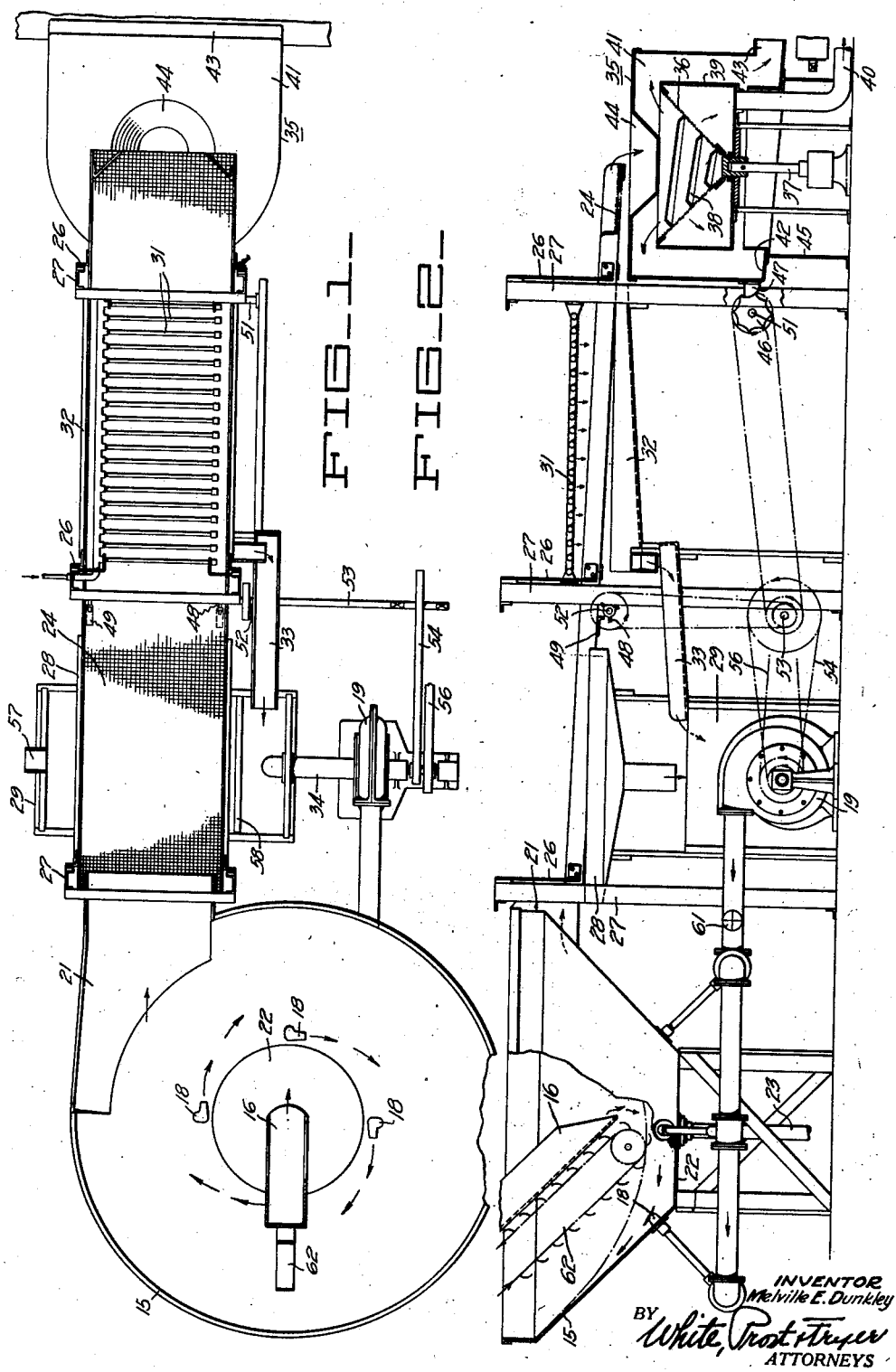
INVENTOR
Melville E. Dunkley
BY White, Prost &Fryer
ATTORNEYS Patented Sept. 8, 1931

1,822,276

UNITED STATES PATENT OFFICE

MELVILLE E. DUNKLEY, OF SAN FRANCISCO, CALIFORNIA, ASSIGNOR TO ROSENBERG BROS. AND CO., OF SAN FRANCISCO, CALIFORNIA, A CORPORATION OF CALIFORNIA

FRUIT TREATMENT MACHINE AND METHOD

Application filed September 1, 1928. Serial No. 303,428.

This invention relates generally to machines and methods of treating partially dehydrated fruit, particularly raisins, so as to place the same in marketable condition.

It is an object of this invention to devise a simple and effective method and apparatus for effecting separation of stones and like foreign solids from partially dehydrated fruit.

It is a further object of this invention to devise a machine for treatment of raisins, which will deliver the raisins in clean and comparatively dry condition separated from stones, sand, and like foreign solids.

It is a further object of this invention to so co-ordinate a hydraulic separating machine adapted for the separation of stones and like foreign solids from partially dehydrated fruit, together with washing apparatus, so that water recovered from the washing apparatus is utilized in the hydraulic separating device.

It is another object of this invention to devise a novel apparatus for effecting drying of partially dehydrated fruit after the fruit has been washed with water.

Further objects of the invention will appear from the following description in which I have set forth the preferred embodiment of my invention. It is to be understood that the appended claims are to be accorded a range of equivalents consistent with the state of the prior art.

Referring to the drawings:

Figure 1 is a plan view illustrating a machine embodying the principles of my invention.

Fig. 2 is a side elevational view of the machine shown in Fig. 1, portions of this machine being in cross section.

My apparatus can be outlined briefly as including a hydraulic separating device within which the fruit is washed and is separated from heavier foreign solids, such as stones and pebbles. From the separating device the fruit is delivered to a conveyor, which serves to deliver the fruit to a mechanical dryer. As the fruit moves along the conveyor, contaminated water is first permitted to drain away and the fruit is then rinsed with fresh water.

The hydraulic separating device preferably comprises a treatment vessel 15 which is substantially circular in horizontal cross section, and which preferably has outwardly inclined side walls so as to be upwardly divergent. The raisins or other fruit from which stones or like solid particles which are to be separated are suitably introduced into this vessel and for this purpose I have shown a trough 16 extending into vessel 15 to discharge substantially centrally of the same. I effect a separation between the raisins and stones, pebbles, or like foreign solids by subjecting the raisins to a vortical current of water. To produce such a vortical movement, I prefer to introduce water into the treatment vessel thru a plurality of tangentially directed nozzles 18. These nozzles are supplied with water from a suitable source, as for example a pump 19. The upper portion of the treatment chamber is in communication with a discharge trough or conduit 21, thru which separated raisins and water are discharged. As will be presently explained, in the operation of my hydraulic separating device, the raisins are carried up the sides of the treatment vessel by the water, while the stones and heavier solids are caused to separate out and are moved toward the central portion of the bottom 22 of the container, from which locality they can be removed continuously or from time to time, thru a convenient conduit 23.

The conveyor is preferably of the vibrating type and consists of a screen 24, along which the raisins are conveyed after being discharged from the conduit 21. Screen 24 is inclined with respect to the horizontal, and is resiliently supported by means of springs 26, which springs in turn are mounted upon suitable supporting uprights 27. Mounted directly below that portion of the conveyor adjacent to the discharge conduit 21, there is an open top receptacle or pan 28, from which water may drain to a reservoir 29.

Arranged intermediate the ends of the screen 24 and positioned above the same, are a series of nozzles 31 by means of which fresh wash or rinsing water can be sprayed upon the raisins as they pass along the conveyor. Arranged below the screen near this portion of the conveyor, there is another pan 32 adapted to receive rinsing water drained from the raisins and to likewise return this water to reservoir 29, by means of a trough 33. Intake pipe 34 of the pump 19 communicates with this reservoir so that wash water is reintroduced into the hydraulic separator.

The dryer 35 is of comparatively simple construction and preferably consists of a conical shaped foraminous basket 36 adapted to be rotated at a comparatively high speed by means of shaft 37. Basket 36 is positioned directly below the discharge end of the conveyor screen 24. Its inner periphery may be provided with a spiral deflector 38 to impede movement of raisings and thus to effect more thorough drying. Arranged to surround the sides of the basket, there is a vessel 39 which receives water thrown outwardly from the sides of the basket, and which discharges the same thru a drain 40. Surrounding both the basket and the vessel 39, there is a hopper 41 having an inclined trough like bottom 42 leading to a discharge opening 43. The upper portion of hopper 41 provides a downwardly directed funnel 44 for guiding raisins into basket 36. Hopper 41 is preferably secured to suitable resilient support members 45, and is vibrated by suitable means, such as a cam 46 engaging a member 47 secured to hopper 41. The conveyor screen 24 is likewise vibrated longitudinally by means of a cam 48 adapted to engage a member 49 secured to screen 24. Shafts 51 and 52 upon which cams 46 and 48 are mounted, can be driven from any suitable source of power. In this instance I have shown shaft 52 driven by a counter shaft 53 which likewise drives shaft 51, while countershaft 53 is driven from a connection to the shaft of pump 19 through belt 54. Pump 19 is suitably driven as by means of a belt 56.

In operating my machine raisins or other partially dehydrated fruit is introduced into the treatment chamber 15 through the trough 16, and are distributed about the interior of the treatment chamber. It is presumed that at this time pump 19 is in operation to discharge water tangentially into the treatment chamber, and thereby to maintain a vortical movement of water. Preferably the water introduced is controlled as by means of valve 61, and control of this valve varies the speed and the separating effect of the vortex. To secure efficient separation, valve 61 is opened sufficiently to cause raisins to be carried into discharge 21 without the stones and foreign solids. The raisins are caught up by the swirling currents of water and by centrifugal force are moved outwardly and upwardly along the sides of the treatment chamber, until discharged together with water through conduit 21. For some reason which I cannot clearly explain, the stones and pebbles are not carried upwardly with the raisins but move toward the center of the bottom 22.

Raisin stems and foreign solids tend to float upon the water and collect near the center of the chamber, where they can be removed by suitable means such as a skimmer provided by a bucket conveyor 62.

When raisins are discharged upon the screen 24, the water carried over from the hydraulic separators, which is comparatively contaminated due to dirt and foreign substances washed from the raisins, immediately drains from the raisins and is collected by pan 28 and diverted to the reservoir 29. As the raisins pass below the spray 31, they are subjected to the rinsing action of fresh water which likewise drains from the raisins and is collected in pan 32 and conveyed to reservoir 29. The basket 36 of the dryer 35 is rotated at high speed and the raisins introduced to the same are caused by centrifugal force to move upwardly along the sides of the basket, their progress being impeded by spiral deflector 38. Substantially all water clinging to the skin of the raisins is removed by this centrifugal treatment, and is drained from the reservoir 35. The dried raisins are discharged over the rim of the basket to hopper 41 from which they are conveyed thru opening 43.

Since reservoir 29 not only receives contaminated water from the pan 28 but likewise the comparatively clean water from pan 32, more water will be present than is required for supplying pump 19. The excess of contaminated water is permitted to discharge from pipe 57. A baffle 58 is preferably provided in reservoir 29, so that pump 19 receives practically all the rinsing water returned from pan 32 but only a part of the water returned by pan 28. The excess of contaminated water is permitted to discharge from pipe 57.

I claim:

1. A machine for treating partially dehydrated fruit comprising a treatment chamber into which the fruit is introduced, means for effecting a vortical movement of water within said chamber to effect separation of the fruit from foreign solids, and means for removing separated stems and like solids from said chamber.

2. A machine for treating partially dehydrated fruit comprising a substantially circular treatment chamber into which fruit containing heavy and light foreign matter is introduced, a discharge conduit arranged tangentially to the treatment chamber, means for introducing a fluid into said chamber to form a vortex whereby the fruit is whirled about the chamber and a portion of it is deposited on the discharge conduit, the vortical movement of the fruit freeing the heavy and light foreign matter from the fruit, and means for collecting the heavy foreign matter adjacent to the chamber base.

3. A machine for treating partially dehydrated fruit comprising a substantially circular treatment chamber into which fruit containing heavy and light foreign matter is introduced, a discharge conduit arranged tangentially to the treatment chamber, means for introducing a fluid into said chamber to form a vortex whereby the fruit is whirled about the chamber and a portion of it is deposited upon the discharge conduit, the vortical movement of the fruit freeing the heavy and light foreign matter from the fruit, means for collecting the heavy foreign matter adjacent to the chamber base, and means for removing the light particles collecting at substantially the vortex center.

4. A method of effecting separation of partially dehydrated fruit from foreign solids, both heavier and lighter than the fruit, comprising: introducing the fruit and foreign solids into a treatment vessel; causing the fruit and solids to move vortically about the vessel by means of a liquid tangentially introduced into the vessel whereby the heavier solids are separated from the fruit and moved toward the center of the vortex along the bottom of the vessel, the lighter solids moved to the center on the surface of the vortically moving liquid for removal, and the fruit is ejected from the liquid onto a discharge conduit.

5. In a machine for treating partially dehydrated fruit, a treatment chamber into which the fruit is introduced, means for effecting a vortical movement of water within said chamber to effect separation of the fruit from foreign solids, and a skimmer for removing separated stems and like materials from said chamber.

In testimony whereof, I have hereunto set my hand.

MELVILLE E. DUNKLEY.